United States Patent [19]

Janssen

[11] Patent Number: 4,873,919
[45] Date of Patent: Oct. 17, 1989

[54] DISPOSABLE BAGS
[76] Inventor: Alexander P. Janssen, c/o Data Visible, P.O. Box 7767, Charlottesville, Va. 22901
[21] Appl. No.: 346,271
[22] Filed: Apr. 28, 1989

Related U.S. Application Data

[63] Continuation of Ser. No. 145,516, Jan. 19, 1988, abandoned.
[51] Int. Cl.$^4$ ............................................. A47G 27/10
[52] U.S. Cl. ..................................... 99/403; 99/407; 99/410
[58] Field of Search ................ 99/295, 327, 403, 410, 411, 412, 418, 444, 467, 407; 126/39M, 373; 229/1.5R, 3.5R, 3.5MF; 426/113, 412

[56] References Cited

U.S. PATENT DOCUMENTS

| | | |
|---|---|---|
| Re. 27,345 | 4/1972 | Weisberg . |
| 508,831 | 11/1893 | Habberton . |
| 1,217,818 | 2/1917 | Peterson . |
| 1,281,984 | 10/1918 | Long . |
| 1,566,874 | 12/1925 | Jackson . |
| 1,704,879 | 3/1929 | Bridgham . |
| 2,323,623 | 7/1943 | Porter et al. . |
| 2,807,550 | 9/1957 | Zarotschenzeff et al. . |
| 2,912,336 | 11/1959 | Perino . |
| 2,990,096 | 6/1961 | Crosby . |
| 3,008,837 | 11/1961 | Kaplan . |
| 3,027,261 | 3/1962 | Samara . |
| 3,027,999 | 4/1962 | Heroy, Jr. . |
| 3,088,255 | 5/1963 | Griem . |
| 3,117,875 | 1/1964 | Burns et al. . |
| 3,136,409 | 6/1964 | Schumann . |
| 3,249,285 | 5/1966 | Dollheimer et al. . |
| 3,307,955 | 3/1967 | Pirtle . |
| 3,407,077 | 10/1968 | Helin . |
| 3,547,660 | 12/1970 | Weisberg . |
| 3,597,238 | 8/1971 | Scharre . |
| 3,615,711 | 10/1971 | Markus et al. . |
| 3,625,348 | 12/1971 | Titchenal et al. . |
| 3,716,369 | 2/1973 | Perlman . |
| 3,750,873 | 8/1973 | Roman . |
| 3,779,231 | 12/1973 | Anderson . |
| 3,873,735 | 3/1975 | Chalin et al. . |
| 3,935,810 | 2/1976 | Milano . |
| 3,946,654 | 3/1976 | Janssen ................................ 99/403 |
| 4,005,645 | 2/1977 | Janssen ................................ 99/403 |
| 4,215,629 | 8/1980 | Janssen ................................ 99/403 |
| 4,412,482 | 11/1983 | Janssen ................................ 99/403 |
| 4,499,817 | 2/1985 | Janssen ................................ 99/403 |

FOREIGN PATENT DOCUMENTS

| | | |
|---|---|---|
| 965498 | 7/1964 | United Kingdom . |
| 966253 | 8/1964 | United Kingdom . |
| 1221098 | 2/1971 | United Kingdom . |

OTHER PUBLICATIONS

Cooking Magic Bags, The Drackett Products Co., 1971.
Meals in Minutes, Sears Roebuck and Company, 1973.
Dazey, 1976 Buyer's Guide.
Dazey Seal a Meal Recipe and Instruction Book, date unknown.
Arthur Godfrey's Selling Seal-A-Meal, date unknown.
Reproduction of the top, bottom and sides of a box, Cooking Magic Bags, The Drackett Products Co., date unknown.

*Primary Examiner*—Timothy F. Simone
*Attorney, Agent, or Firm*—Hughes & Multer

[57] ABSTRACT

Systems for cooking comestibles in a disposable bag to preserve the taste, texture, and nutritional value of the comestibles; to keep the cooking vessel in which the system is employed from being soiled; and to facilitate the storage of leftovers. The accessory has a base and inwardly extending bag-supporting elements pivotably fixed to that base at intervals therearound. The inner ends of these elements are fixed to the upper, open end of the bag at intervals therearound; and the upper end of the bag can consequently be opened and closed by rotating the bag-supporting elements. Witness marks around the upper edge of the bag allow the bag-supporting elements to easily be attached to the upper edge of the bag at equidistant intervals therearound, ensuring that the bag can be fully opened by manipulation of the bag-supporting elements. Witness marks adjacent apertures at the lower corners of the bag ease the task of locating those apertures, which are used in hooking those lower corners of the bag over diametrically opposed studs on the base of the cooking utensil accessory to anchor the lower end of the bag. That shapes the lower end of the bag into a configuration which facilitates the removal of comestibles therefrom and promotes efficient and uniform cooking of the comestibles in applications where the bag is surrounded by a liquid cooking medium by keeping the bag from floating upwardly through that medium.

16 Claims, 4 Drawing Sheets

DISPOSABLE BAGS

This is a continuation of co-pending application Ser. No. 145,516 filed on Jan. 19, 1988, abandoned.

TECHNICAL FIELD OF THE INVENTION

The present invention relates to novel, improved, disposable bags for cooking comestibles.

More specifically, the present invention relates to bags of the foregoing character which: (1) are fabricated from a folded-in-two sheet (or a flattened tube) of pliant sheet material, and (2) have witness or registration marks equidistantly spaced around the open upper end of the bag to facilitate the attachment of the bag to a cooking utensil accessory with which the bag is employed.

BACKGROUND OF THE INVENTION

Earlier issued Alexander P. Janssen Pat. Nos.: 3,946,654 dated Mar. 30, 1976, and entitled COOKING UTENSILS; 4,005,645 dated Feb. 1, 1977, and entitled COOKING UTENSIL ACCESSORIES; and 4,215,629 dated Aug. 5, 1980, and entitled COOKING UTENSILS are hereby incorporated in this specification by reference. Those patents disclose: (1) novel cooking utensils intended to be used with a disposable bag in which the comestibles are contained during the cooking process, and (2) novel accessories for giving conventional utensils the same capabilities as the utensils specifically designed for use with disposable bags.

In cooking comestibles by the techniques described in the foregoing patents, the bag is surrounded by a cooking medium which transfers heat to the contents of the bag during the cooking cycle. The cooking medium will typically be water in the case of stovetop cookery and air for oven cookery.

Cooking in disposable bags as just described has a number of important advantages. First, this permits comestibles to be cooked in their own juices. The natural taste of the food is thereby preserved; and the loss of nutritional values which occurs when foods are cooked in water is avoided, along with the mushy or waterlogged texture which commonly results.

Another virtue is that the utensil is not soiled during the cooking process. Thus, the inconvenience of cleaning the utensil after it is used is eliminated; only rinsing and drying are required.

Furthermore, the bag in which the comestibles are cooked can be used to store them. This is a particular convenience if the bag is stored in a refrigerator container or the like as the latter will not become soiled.

Particularly useful embodiments of the previously disclosed Janssen inventions have an arrangement for detachably securing the lower corners of the bag in place. This produces two important advantages.

First, this keeps the bag from being buoyed upwardly in a liquid cooking medium and, also, permits the cooking medium to more effectively collapse the bag against the comestibles. The result is that the bag is more uniformly surrounded by the cooking medium, producing more efficient and uniform cooking of the comestibles.

Second, by securing the lower end of the bag in place, corners are eliminated; and a rounded, more open shape is given to the lower end of the bag. This significantly facilitates access to the comestibles in the bag and the removal of the comestibles from the bag.

Novel, disposable, comestibles-containing bags for the cooking utensils and accessories just described are disclosed in U.S. Janssen Pat. Nos.: 4,412,482 dated Nov. 1, 1983, and entitled DISPOSABLE COOKING BAGS and 4,499,817 dated Feb. 19, 1985, and also entitled DISPOSABLE COOKING BAGS. Those patents are also hereby incorporated in this specification by reference.

The disposable cooking bags disclosed in the foregoing patents have an open upper end; and the cooking utensil accessories with which they are used have a circular base and a set of concomitantly pivotable, bag-supporting elements that are spaced around the base and attached to the upper edge of the base. The inner ends of the pivotable elements are clipped or otherwise fixed to the upper edge of the disposable bag at intervals therearound. Those elements can consequently be pivoted: (1) upwardly and outwardly to open the upper end of the bag, and (2) downwardly and inwardly to close that end of the bag.

Thus, the upper end of the bag can be opened or spread to facilitate the loading of comestibles into the bag and the removal of cooked comestibles from the bag. And the just-described mechanism allows the upper end of the disposable bag to be closed during the cooking cycle to the extent that a liquid cooking medium surrounding the bag is kept from entering the bag while gases and vapors evolved from the comestibles are allowed to escape. This permits the bag to collapse against its contents, considerably increasing the efficiency with which heat is transferred to the comestibles; it also maximizes the uniformity with which heat is transferred to the comestibles from different directions. Furthermore, by permitting gases and vapors to escape, the tendency of the bag to float is minimized as is the possibility of the bag rupturing due to a build-up of internal pressure.

Notwithstanding the foregoing, those systems for cooking comestibles that are described in the several patents cited above have a significant disadvantage. This is that it is somewhat difficult and time consuming to attach the upper edge of the disposable cooking bag to the inner ends of the pivotable elements with an equal chord—or length of upper bag edge—between adjacent elements. It will be appreciated by those to whom this specification is addressed that approximately equal spacing is required because the upper end of the disposable bag cannot otherwise be fully opened. Consequently, with uneven spacing, difficulty can be experienced in loading comestibles into the bag and in removing cooked comestibles therefrom. Alternatively, the user must tinker with the connections between the bag edge and the elements to which that edge is attached until the spacing is more-or-less equal; and that can waste an appreciable amount of time.

SUMMARY OF THE INVENTION

I have now invented, and disclosed herein, certain new and novel disposable cooking bags which: (1) are designed for use with the cooking utensil accessories disclosed in my above-cited, earlier issued patents, but (2) allow the inner ends of the accessory's pivotable, bag-supporting elements to be easily and quickly attached to the open, upper edge of the bag at precisely equal intervals therearound. Thus, the user can easily insure that the bag can be fully opened after it is assembled to the accessory.

To a large extent, the novel disposable cooking bags described briefly in the preceding paragraph and in more detail hereinafter are like those disclosed in my previously issued, above-cited U.S. Pat. Nos. 4,412,482 and 4,499,817.

Bags as disclosed in the foregoing patents can be made by: (1) folding a sheet of pliant material along its horizontal midline to form what will become a closed, lower bag end and the sides of the bag, and then (2) sealing the sides of the bag together along each of the two edges of the bag by seams extending from the closed lower end to the open upper end of the bag. These seams keep fluids from leaking through those gaps between the sides of the bag at the edges thereof.

Alternatively, a bag of the character disclosed in the above-cited '482 and '817 patents can be fabricated by sealing together the two sides of a flattened tube of pliant material at the lower end of the tube with a seam extending transversely from edge-to-edge of the tube to form a closed, lower bag end.

The novel disposable cooking bags disclosed herein differ from those described in my earlier issued '482 and '817 patents most significantly in that equidistantly spaced witness or registration marks equalling the number of pivotable, bag-supporting elements of the cooking utensil accessory with which the bag is to be employed are provided at the upper edge of the bag. By simply attaching the pivotable, bag-supported elements of the accessory to the upper bag edge at the locations designated by the witness marks, the user can ensure that the chords of the upper bag edge between each pair of adjacent, bag-supporting elements will be equal and that the bag can consequently be fully opened.

THE PRIOR ART

Disposable bags as such are not new as shown by: U.S. Pat. Nos. 2,323,623 issued July 6, 1943, to Porter; 2,912,336 issued Nov. 10, 1959, to Perino; 3,008,837 issued Nov. 14, 1961, to Kaplan; 3,027,261 issued Mar. 27, 1962, to Samara; 3,088,255 issued May 7, 1963, to Griem; 3,117,875 issued Jan. 14, 1964, to Burns; 3,547,660 issued Dec. 15, 1970, to Weisberg; 3,615,711 issued Oct. 26, 1971, to Markus et al.; 3,716,369 issued Feb. 13, 1973, to Perlman; 3,750,873 issued Aug. 7, 1973, to Roman; and 3,935,810 issued Feb. 13, 1976, to Milano; British Pat. No. 965,498 published July 29, 1964; the Dracket Products Co., pamphlet entitled "How to Use Cooking Magic Bags" copyrighted in 1971; and the Sears recipe and instruction book entitled "Meals in Minutes". However, none of the foregoing items of prior art are relevant to the patentability of the present invention; none disclose bags which are designed for use with cooking accessories having pivotable, bag-supporting elements for opening and closing the upper end of the bag, let alone bags of that character which make it easy to quickly attach the inner ends of the pivotable elements to the upper edge of the bag at equally spaced intervals therearound.

OBJECTS OF THE INVENTION

From the foregoing, it will be apparent to the reader that one important and primary object of the present invention resides in the provision of novel, improved, disposable cooking bags.

A second, primary object of the invention is the provision of disposable bags which are particularly suited for use with cooking utensil accessories employing the principles of those utensils and accessories disclosed in my earlier issued and above-cited Pat. Nos. 3,946,654; 4,005,645; and 4,215,629.

A related and also important object of the present invention is the provision of disposable cooking bags as characterized in the preceding object with witness marks along the upper edge thereof which allow the inner ends of pivotable, bag-supporting elements to be easily attached to the upper edge of the bag at equal intervals therearound, thereby ensuring that the upper end of the bag can be fully opened to facilitate the loading of comestibles into the bag and the removal of cooked comestibles therefrom.

A further important and primary object of the invention is the provision of disposable bags for cooking comestibles which are so constructed as to: (1) provide rapid and uniform cooking of the comestibles in a manner which preserves their taste, texture, and nutritional value without soiling the utensil in which the comestibles are cooked, and (2) provide a storage container for leftover contents of the bag.

Another important and primary object of the invention resides in the provision of disposable bags in accord with the preceding objects which can be inexpensively manufactured.

Other important objects and features and additional advantages of the invention will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
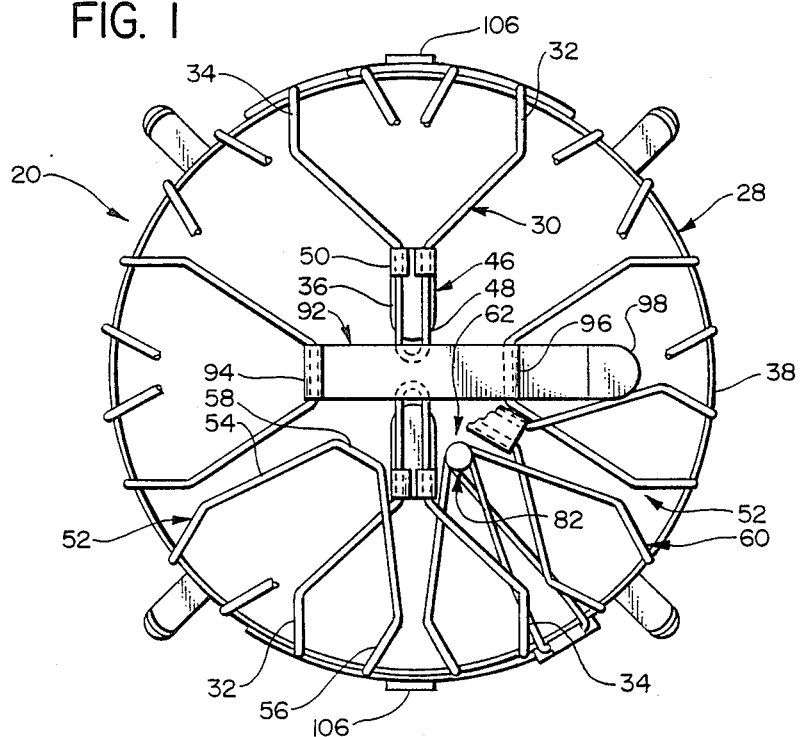
FIG. 1 is a plan view of an attachment or accessory which is designed to be used with a disposable bag embodying the principles of the present invention and in a conventional pot or pan to cook comestibles.
Figure 2:
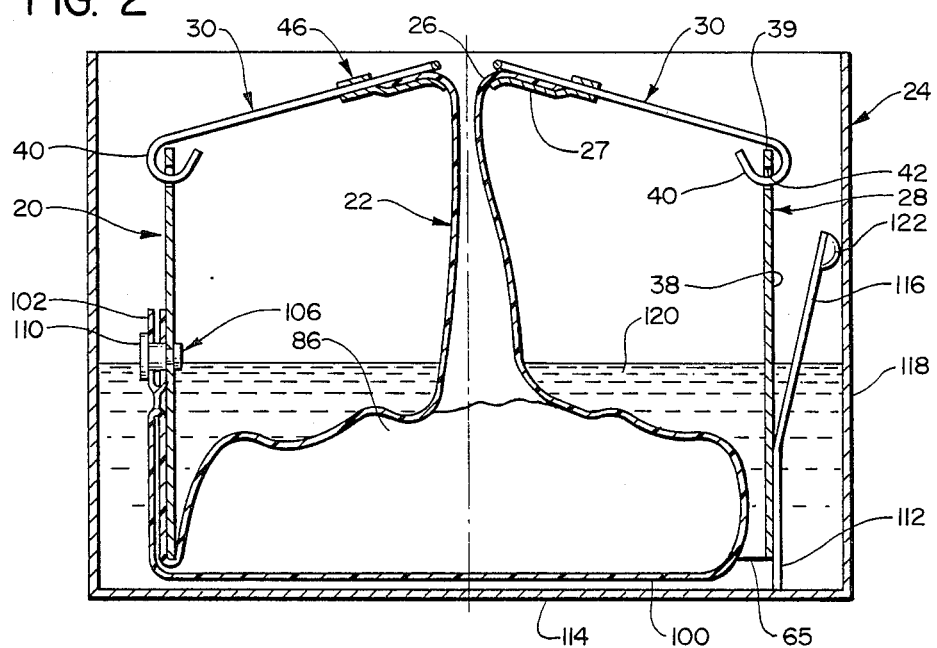
FIG. 2 is a vertical section through the accessory, the cooking utensil, and the disposable bag with the latter collapsed around the comestibles being cooked to promote the transfer of heat to the comestibles and the upper end of the bag closed to keep the cooking medium from entering the disposable bag during the cooking cycle while allowing gases and vapors to escape therefrom.
Figure 3:
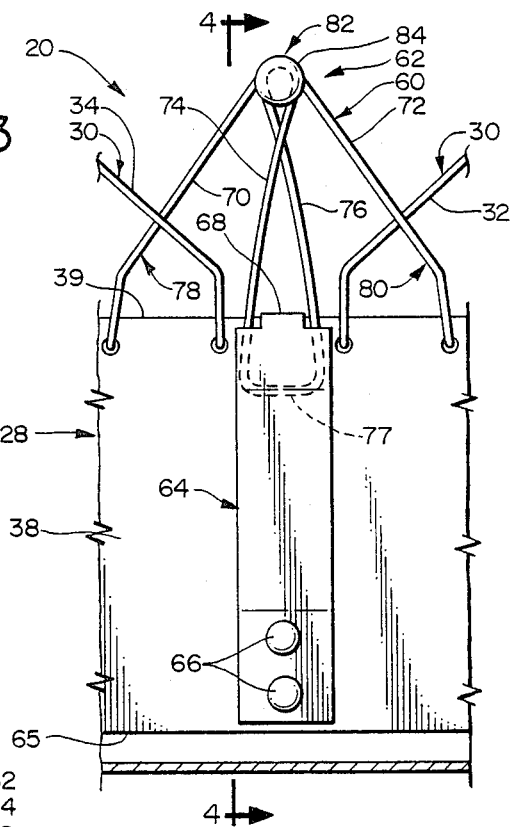
FIG. 3 is a partial elevation of the accessory, showing a toggle mechanism incorporated in the accessory to open and close the upper end of the disposable bag in one of that mechanism's two operative configurations.

Referring now to the drawing, FIGS. 1-3 depict an accessory 20 which is designed to be used: (1) with a disposable cooking bag 22 of folded sheet construction and embodying the principles of the present invention, and (2) in a conventional cooking vessel 24 to cook comestibles in the novel manner discussed above, i.e., in a way which preserves the taste, texture, and nutritional value of the comestibles, all without soiling the vessel 24 in which the comestibles are cooked.

Accessory 20 is employed to keep disposable bag 22 submersed while the comestibles are cooking, to constrict opening 26 at the upper end or edge 27 of the bag during the cooking process, and to subsequently enlarge opening 26 so that comestibles can be easily loaded into and removed from the bag.

Among the major components of bag-associated accessory 20 are a cylindrical base 28 and a set of cooperating, inwardly extending elements 30 for supporting the upper end 27 of bag 22 from base 28.

As best shown in FIG. 1, each of the bag-supporting elements 30 has a V-shaped left-hand leg 32 and a similarly shaped right-hand leg 34 connected by a necked down, integral, U-shaped portion 36 at the inner end of the element.

Bag-supporting elements 30 are pivotally fixed to the side wall 38 of base 28 at the upper edge 39 thereof. The pivotable connections to the base are provided by circular end portions 40 of legs 32 and 34. These extend through apertures 42 in the side wall 38 of base 28.

The upper end or edge 27 of disposable cooking bag 22 is attached to the inner ends of bag-supporting elements 30 by spring clips 46. These clips each have a flat, leaf spring portion 48 held against the necked down, distal or inner end portion 36 of the associated pivotable element 30 by a retainer portion 50 at the outer end of the clip. The retainer portion is bent around the legs 32 and 34 of the associated pivotable element 30 to secure the clip in place. The upper edge 27 of the disposable bag 22 is slipped between the spring portions 48 of clips 46 and the necked down portions 36 of pivotable elements 30, permitting spring portions 48 to clamp the upper end 27 of disposable bag 22 against the distal ends 36 of the pivotable elements 30.

In bag-associated accessory or attachment 20, the pivotable, bag-supporting members 30 bearing bag-engaging spring clips 46 are alternated with concomitantly pivotable elements 52 having truncated legs 54 and 56 connected by an integral, lateral leg 58. The pivotable elements 52 are assembled to and around accessory base upper edge 39 in the same manner as bag-supporting elements 30 with the left-hand leg of each element 30 or 52 lying under the right-hand leg of the element to its left and the right-hand leg overlying the left-hand leg of the element to its right. Thus, each element 30 or 52 supports and is supported by the adjacent pivotable element. As a consequence, all of the elements 30 and 52 move in unison as one of them is rotated either upwardly and outwardly to open bag 22 or downwardly and inwardly to close the opening 26 at the upper end 27 of the bag.

The arrangement just described has the advantage of reducing the number of the more complex bag engaging elements 30 and, therefore, the cost of accesory 20.

In one actual embodiment of my invention, intended for use with a three-quart saucepan, there are six bag-supporting elements of the character identified by reference character 30. There are five pivotable elements of the character identified by reference character 52. The place of a sixth element of the latter type is taken by the pivotable member 60 of a retainer or toggle mechanism 62.

Figure 4:
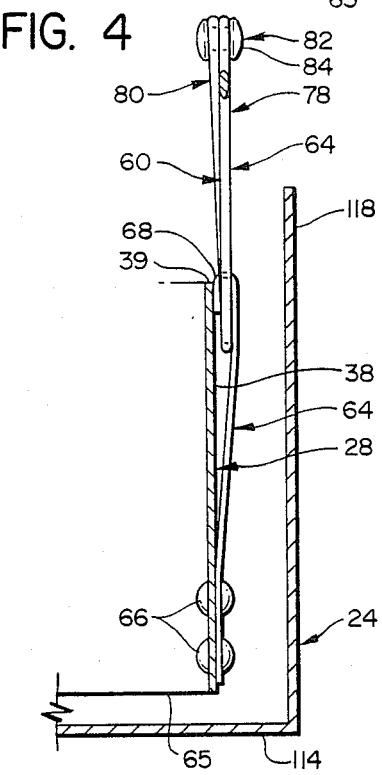
FIG. 4 is a section through the accessory, taken substantially along line 4—4 of FIG. 3.

As best shown in FIGS. 3 and 4, toggle mechanism 62 also includes a flat, vertically extending spring 64 fixed to attachment base 28 adjacent its lower end or edge 65 as by rivets 66. As its upper, free end, the spring terminates in a downwardly opening hook or loop 68.

Member 60 of toggle mechanism 62 has inwardly extending, outer legs 70 and 72 by which the member is pivotally attached to base 28 in the same manner as the pivotable elements 30 and 52 described previously. Integral with the outer legs 70 and 72 are two inner legs 74 and 76 connected by a transversely extending leg 77 at their lower and outer ends. The inner and outer legs of member 60 are also connected to the base 28 of accessory 20 in the same manner that pivotable elements 30 and 52 are.

The configuration just described produces two generally V-shaped sections 78 and 80 defined respectively by legs 70 and 74 and by legs 72 and 76, the two legs in each section being connected at their distal ends. A fastener 82 inserted through the two V-shaped sections 78 and 80 at these ends fixes the two sections of the member together with one section behind the other (see FIG. 4). The laterally acting spring tension of the two sections and head 84 on fastener 82 keep the two toggle mechanism sections 78 and 80 of toggle member 60 in place.

As shown in FIG. 3, the outer, left-hand leg 70 of member 60 lies under the right-hand leg 34 of the bag-supporting element 30 to its left; and the right-hand leg 72 of member 60 overlies the left-hand leg 32 of the element 30 to its right. Accordingly, member 60 pivots concomitantly with the bag-supporting elements 30 and the associated pivotable elements 52.

Figure 6:
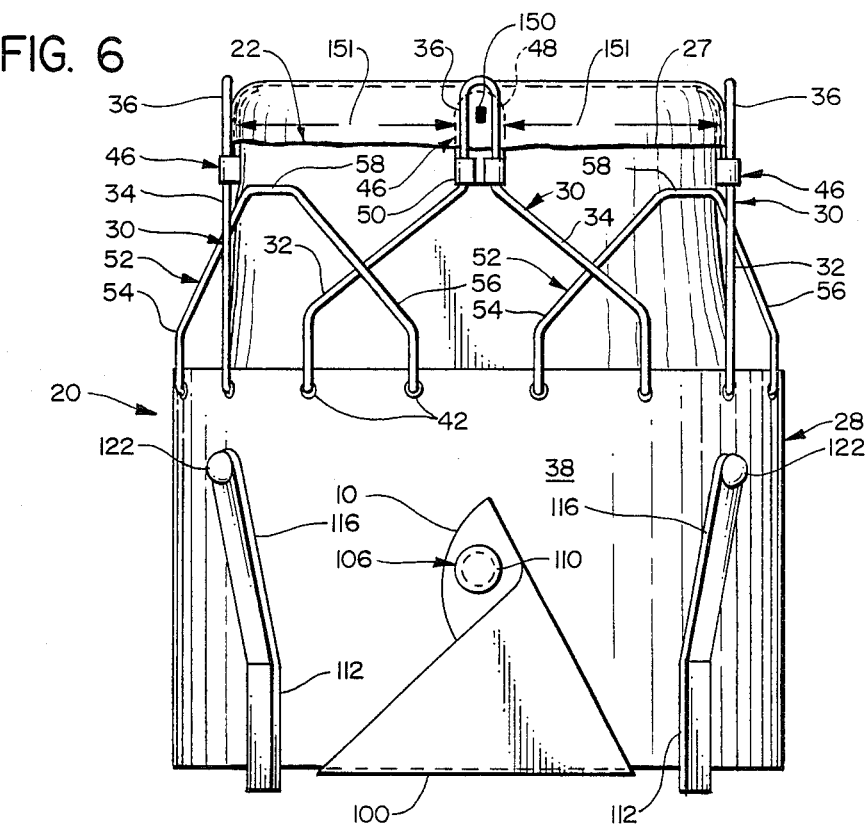
FIG. 6 is an elevation of the accessory and the disposable bag with the upper end of the latter open to facilitate the loading of comestibles into the bag and the removal of cooked comestibles therefrom.

When the bag-supporting elements 30 are rotated upwardly and outwardly to spread open the upper end 27 of bag 22, element 60 is displaced to the generally vertical position shown in FIG. 4. In this position the lower end portions of inner legs 74 and 76 are confined between spring 64 of the toggle mechanism and the base 28 of attachment 20, maintaining pivotable member 60 in the illustrated position. Because of the interconnections between member 60 and the pivotable elements 30 and 52 discussed above, bag-supporting elements 30 are locked in the open position with the open end 27 of the bag spread and opening 26 enlarged to the maximum extent (see FIG. 6).

Figure 5:
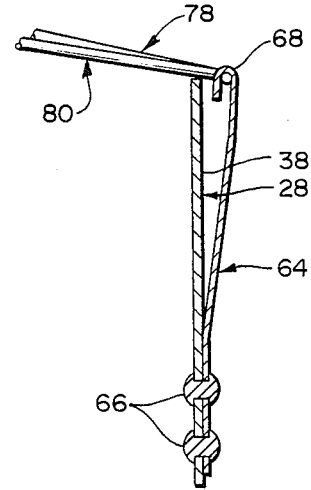
FIG. 5 is a fragmentary vertical section through the accessory, showing its toggle mechanism in the second of the latter's two operative configurations.

When the pivotable elements 30 and 52 are displaced to the position shown in FIG. 1 to close the opening 26 at the upper end 27 of bag 22 and to collapse the bag around comestibles 86 (see FIG. 2), the pivotable element 60 of toggle mechanism 62 moves from the position shown in FIG. 4 to that shown in FIG. 5. As it does so, the transversely extending leg 77 of member 60 moves upwardly until it bottoms in the loop or hook 68 at the upper end of spring 64; and legs 74 and 76 of the member engage the upper edge 39 of base 28. This precludes further downward movement of element 60, bag-supporting elements 30, and pivotable elements 52.

As discussed above, this limiting of the downward movement of bag-supporting elements 30 is important because it permits bag 22 to collapse around the comestibles 86 in a manner which insures uniform and efficient cooking of the comestibles and keeps the cooking medium from flowing into the bag in those applications where a liquid is employed. Also, this limiting of downward movement keeps the various accessory components 30, 52, and 60 from pivoting downwardly to the extent that the element attaching loops at their outer ends can become unhooked from attachment base 28. Accordingly, it is not necessary to close these loops after the pivotable elements are assembled to base 28. Thus, the novel toggle mechanism 62 simplifies the assembly of the attachment with a concomitant reduction in its cost.

Attachment 20 also has a latch 92 of sheet metal construction. At one end latch 92 is pivotably mounted on the transverse leg 58 of one of the truncated pivotable elements 52, that leg 58 extending through a loop 94 formed at the end of the latch.

Subsequent portions of the latch extend upwardly, horizontally, and downwardly to clear the inner ends of pivotable members 30. These are followed by a hook portion 96 which is engageable with the transverse leg 58 of the element 52 facing that to which the latch is connected to hold the two elements 52 in the FIGS. 1 and 2, "bag closed" positions. As these two elements are interconnected with the remaining pivotable elements 30 and 52 in the manner described previously, the bag-supporting elements 30 are likewise held in the illustrated "bag-closed" orientations.

As its free end, the latch terminates in a handle portion 98 by which the latch can be released and engaged.

Provision is also made in accessory 20 for stretching the lower end 100 of the disposable cooking bag 22 across the lower end 65 of the attachment base 28 and then securing the lower corners 102 and 104 of the bag to base 28 to keep it taut. As discussed previously, this eliminates the corners, facilitating the removal of comestibles 86 from bag 22. Also, the lower end of the bag and its contents are kept from floating upwardly, promoting rapid and uniform cooking of the comestibles.

More specifically, bag 22 is secured to the base 28 of attachment 20 by stretching its closed end 100 across the lower edge 65 of the base and then hooking the lower corners 102 and 104 of the bag over outwardly projecting studs 106 fixed to base 28, the studs extending through holes 108 in the bag adjacent corners 102 and 104. Two diametrically opposed studs 106 are employed, one for each of the two corners 102 and 104 of the bag.

Studs 106 preferably have enlarged heads 110 over which bag 22 is stretched. The bag then relaxes to its original configuration so that the enlarged heads 110 of the studs keep the corners 102 and 104 of the bag in place.

The base 28 of attachment 20 can be made from sheet metal, for example. Legs 112 fixed to the base as by riveting support the base from the bottom wall 114 of the pan or vessel 24 with which attachment 20 is employed. Spring arms 116, integral with legs 112, engage the vessel side wall 118 and center accessory 20 in the vessel. By virtue of this and the supporting of the base in spaced relation to bottom wall 114 of vessel 24, free circulation of the cooking medium 120 to promote uniform cooking of the comestibles 86 in bag 22 is provided.

It is preferred that buffers 122 of a softer material be fixed to the upper, distal ends of spring arms 116 to keep the spring arms from marring the pan. This particularly important if the pan is lined with Teflon or other easily damaged material.

Figure 7:
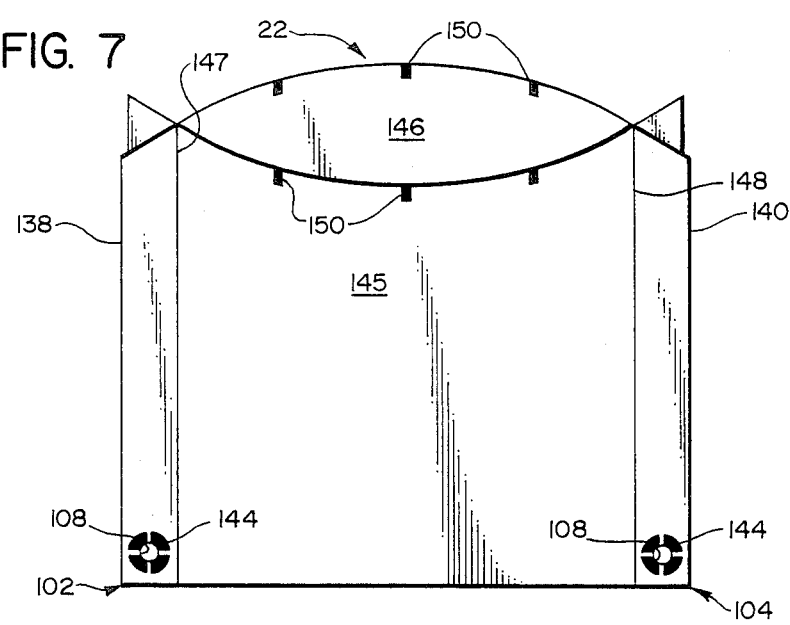
FIG. 7 is a side view of the disposable cooking bag shown in FIGS. 2 and 6; that bag embodies the principles of the present invention.

Referring still to the drawing, FIG. 7 depicts, in more detail, the novel disposable cooking bag 22 discussed above and constructed in accord with, and embodying, the principles of the present invention.

Bag 22 is of single fold construction as mentioned above. And, as was also pointed out previously, it has a rectangular configuration with an upper edge (or open end) 27 and a closed lower end 100 provided by a horizontal fold midway between the ends of the pliant sheet of material from which the bag is made. The holes (or mounting apertures) 108 used in attaching the lower end 100 of the bag to the accessory 20 with which the bag is employed are formed through the bag adjacent this lower end 100 and adjacent the two edges 138 and 140 of the bag. Apertures 108 are preferably surrounded with a black or other colored ring 144 on the front side 145 of the bag to make the apertures easy to locate.

Inwardly of these apertures, the two sides 145 and 146 of the bag 22 which are formed when the sheet of pliant material is folded in two are sealed together at edges 138 and 140 of the bag by seals 147 and 148 which extend from top to bottom of the bag. These seals prevent leakage at the two edges 138 and 140 through the gaps that appear between the facing sides 145 and 146 of the bag when the pliant sheet material is folded to produce the intermediate structure which is converted into bag 22 by seals 147 and 148. Those seals thereby keep cooking fluid from leaking into bag 22 and, also, keep fluid contents of bag 22 from leaking out of the bag.

Witness marks 150 are printed on the upper edge 27 of bag 22 at equal intervals around the periphery of the bag. The spring clips 46 at the inner ends of the pivotable, bag-supporting elements 30 of cooking accessory 20 are attached to the upper edge 27 of bag 22 at the locations marked by witness marks 150. This insures that the chords (or lengths of bag material) 151 between each pair of adjacent clips 46 (see FIG. 6) will be equal and that the bag can accordingly be fully opened to load comestibles into bag 22 and to remove cooked comestibles therefrom.

Figure 8:
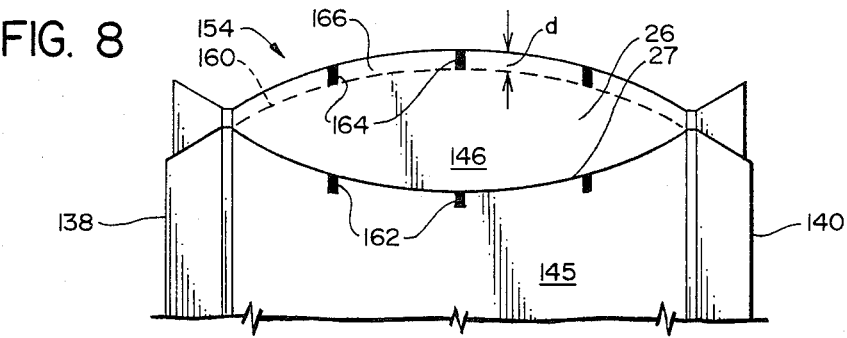
FIG. 8 is a partial side view of a second embodiment of disposable cooking bag constructed in accord with the principles of the present invention.
Figure 10:
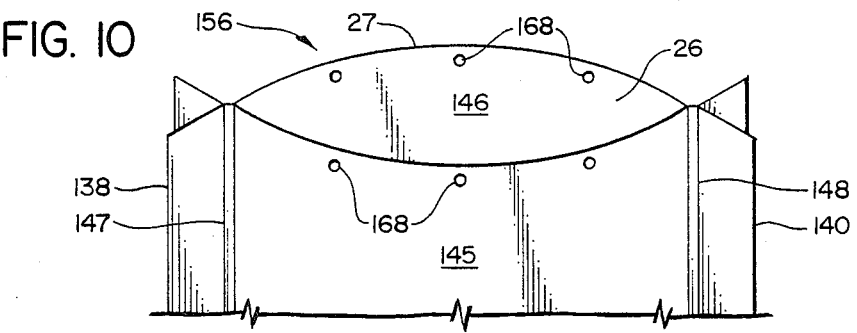
FIGS. 10 and 11 are views, similar to FIG. 8, of two more disposable cooking bags in which the principles of the present invention are incorporated.
Figure 11:
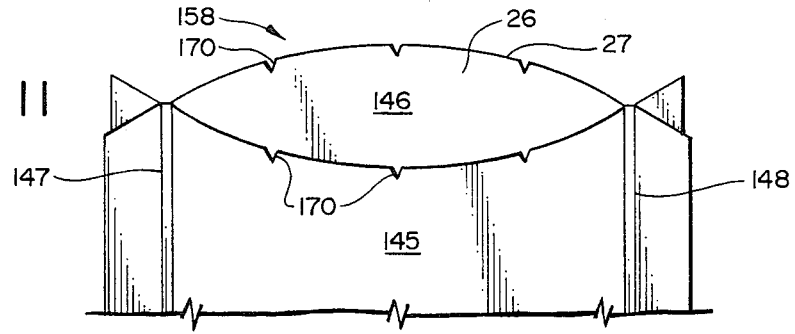

FIGS. 8, 10, and 11 disclose disposable cooking bags 154, 156, and 158 which may be identical to just-discussed disposable cooking bag 22 except as noted hereinafter. To the extent that cooking bags 22, 154, 156, and 158 are alike, the components of those bags have been identified by the same reference characters.

Figure 9:
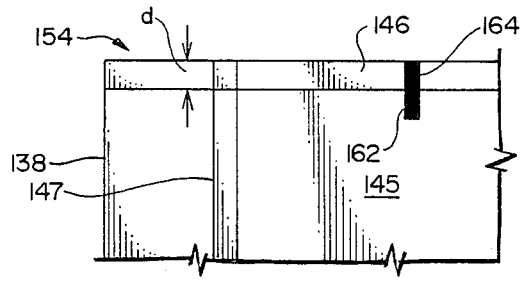
FIG. 9 is a second, in this case partial, side view of the bag of FIG. 8 with the two sides of the bag flattened together.

Referring now to FIGS. 8 and 9, disposable cooking bag 154 differs from the cooking bag 22 described above primarily in that the back side 146 of the bag is longer than the front side 145 and protrudes above the other a distance d as shown in FIG. 9 (and also in FIG. 8 in which dotted line 160 is the upper edge of front bag side 145 projected onto back side 146 of the bag). This has two advantages.

First, it permits both the registration marks 162 on the front side 145 of bag 22 and the registration marks 164 on its rear side 146 to be printed on the same side of the bag. Thus, only one print head is required (or, alternatively, the step of turning the bag over can be eliminated), thereby simplifying, and reducing the cost of manufacturing, the disposable bag.

The second advantage of the disposable cooking bag 154 illustrated in FIGS. 8 and 9 is that the skirt 166 of width d at the upper end of its back side 146 can be easily grasped independently of front side 145. This makes it easy to open the bag from the configuration in which it is supplied—i.e., flat with the two sides of the bag together and perhaps held in that relationship by surface tension and/or static electricity.

FIGS. 7-9 depict disposable cooking bags 22 and 154 with printed registration marks. It is not necessary that these be employed. Instead, the registration marks may be perforations 168 near the upper edge 27 of the bag (FIG. 10) or notches 170 in that edge of the bag (FIG. 11).

Bags of the character described herein may be fabricated from a variety of materials. One that is suitable and available in quantity and in the requisite pliant sheet form is Capran 63B, a Nylon-type film available from Allied Signal.

It is of course not necessary that disposable cooking bags embodying the principles of the present invention be used with the particular accessory illustrated in FIGS. 1-6 and described above to gain the benefits which such bags offer. Other accessories with such bags can equally well be employed are disclosed in my earlier issued Pat. No. 4,005,645; and such bags can be used to equal advantage with the cooking utensils disclosed in my earlier issued Pat. Nos. 3,946,654 and 4,215,629 and specifically designed to be used with disposable cooking bags.

Also, the invention may be embodied in still other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. The combination of a cooking utensil accessory and a cooking bag which can be used in association with said accessory and in a cooking vessel to facilitate the cooking of comestibles in said bag, said accessory including: a base which is adapted to be supported in said cooking vessel and a plurality of inwardly extending elements fixed to said base for concomitant pivotable movement relative thereto, there being bag engageable means at the inner ends of said elements to which the bag can be attached at an opening defining edge thereof, whereby said elements can be concomitantly rotated toward each other to constrict the opening during the cooking of the comestibles and away from each other to enlarge the opening and furnish access to the comestibles in the bag, and there being witness marks around the periphery of the bag at the opening defining edge thereof at equal intervals corresponding to those between the bag engageable inner ends of said pivotable, inwardly extending elements to identify locations around said periphery where the bag engageable means of the inwardly extending elements can be so attached to said bag as to provide equal lengths of bag material between each pair of adjacent elements and thereby permit said bag to be fully opened by the concomitant rotation of said inwardly extending elements away from each other.

2. The combination defined in claim 1 wherein the witness marks are printed around said opening defining edge of said bag.

3. The combination defined in claim 1 wherein the witness marks are notches in said opening defining edge of said bag.

4. The combination defined in claim 1 wherein the witness marks are perforations in the bag adjacent said opening defining edge thereof.

5. The combination of claim 1 wherein said cooking utensil accessory also includes studs fixed to said base to which the lower corners of the bag can be attached to shape the lower end into a configuration which facilitates the removal of comestibles from said bag and to keep said lower bag end from floating upwardly in applications where the bag is surrounded by a liquid cooking medium, wherein the bag is apertured adjacent said lower corners thereof to facilitate the attachment of those corners to said studs, and wherein said bag is marked in the vicinity of the apertures adjacent its lower corners to facilitate the location of those apertures.

6. The combination defined in claim 1 wherein one of the sides of said bag is longer than the other side thereof and has a skirt which extends upwardly beyond said other side of the bag and wherein the witness marks are printed on the inner surface of said skirt and the outer surface of the shorter side of the bag, whereby all of the witness marks can be printed on the bag from one side thereof.

7. A disposable, comestibles-containable bag which is adapted to be used with a cooking utensil accessory having a base and inwardly extending pivotable elements which are fixed to said base and have means at their inner ends for attaching said bag to said elements, said bag having sides and closable and closed ends at the opposite ends of those sides; said bag being adapted to be disposed in the base of the cooking utensil accessory in a generally vertical orientation with its closable end uppermost and said pivotable elements attached to said bag at intervals around the periphery of the bag at the closable end thereof so that said end can be closed and opened by respectively rotating said elements toward and away from each other; and said bag further comprising witness marks equalling in number the number of pivotable elements of the accessory with which said bag is to be employed, said witness marks being spaced equidistantly around the periphery of the bag at the closable end thereof to identify locations corresponding in number to the number of pivotable elements where said elements can be attached to the bag with equal lengths of bag material between each pair of adjacent such elements, thereby ensuring that the closable bag end can be fully opened by the manipulation of said pivotable elements.

8. A disposable, comestibles-containable bag as defined in claim 7 wherein said witness marks are printed on the sides of the bag.

9. A disposable cooking bag as defined in claim 8 wherein one of the sides of said bag is longer than the other side thereof and has a skirt which extends upwardly beyond said other side of the bag and wherein the witness marks are printed on the inner surface of said skirt and the outer surface of the shorter side of the bag, whereby all of the witness marks can be printed on the bag from one side thereof.

10. A disposable, comestibles-containable bag as defined in claim 7 wherein said witness marks are notches in the bag at the closable end thereof.

11. A disposable, comestibles-containable bag as defined in claim 7 wherein said witness marks are perforations through the sides of the bag at the closable end of the bag.

12. A disposable cooking bag as defined in claim 7 which has apertures in those corners at the closed end thereof to facilitate the attachment of those corners to the base of the accessory with which the bag is employed and indicia adjacent those apertures to ease the task of locating the apertures.

13. A disposable, comestibles-containable bag which has two sides which are integral or sealed together at the edges of the bag, a closed end, a closable end, and witness marks for facilitating the attachement of said bag at the closable end thereof to an array of bag engageable elements with equal lengths of bag material between each pair of adjacent elements so that said closable end of said bag can be fully opened by concomitant rotation of said elements away from each other, said witness marks being printed on said bag at equidistant locations around the periphery of the bag and at the closable end thereof.

14. A disposable, comestibles-containable bag which has two sides which are integral or sealed together at the edges of the bag, a closed end, a closable end, and witness marks at equidistant locations around the periphery of the bag at the closable end thereof for facilitating the attachment of said bag at said closable end thereof to an array of bag engageable elements with equal lengths of bag material between each pair of adjacent elements so that said closable end of said bag can be fully opened by concomitant rotation of said elements away from each other, said witness marks being notches in the sides of the bag at the closable end thereof.

15. A disposable, comestible-containable bag which has two sides which are integral or sealed together at the edges of the bag, a closed end, a closable end, witness marks at equidistant locations around the periphery of the bag and at the closable end thereof for facilitating the attachment of said bag at the closable end thereof to any array of bag engageable elements with equal lengths of bag material between each pair of adjacent elements so that said closable end of said bag can be fully opened by concomitant rotation of said elements away from each other, apertures in those corners of the bag at the closed end thereof, and indicia adjacent those apertures at the closed end of the bag to ease the task of locating them.

16. A disposable, comestibles-containable bag which has two sides which are integral or sealed together at the edges of the bag, a closed end, a closable end, and witness marks printed on said bag at equidistant locations around the periphery of the bag and at the closable end thereof, one of the sides of said bag being longer than the other and having a skirt which extends upwardly beyond the other side of the bag at the closable end of the bag and the witness marks being printed on the inner surface of said skirt and on the outer surface of the shorter side of the bag, whereby all of the witness marks can be printed on the bag from one side thereof.

* * * * *